United States Patent
Rakos et al.

(10) Patent No.: US 6,251,505 B1
(45) Date of Patent: Jun. 26, 2001

(54) BACKLIT DISPLAY COMPOSITE FILM

(75) Inventors: Karl Rakos; Paul David Alan Mills, both of Durham; Moira Logan, Teeside; Noel Stephen Brabbs, Luxembourg, all of (GB)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/283,426

(22) Filed: Apr. 1, 1999

(51) Int. Cl.$^7$ ................................................ B32B 7/02
(52) U.S. Cl. ................ 428/212; 428/213; 428/331; 428/480; 428/482
(58) Field of Search .................... 428/212, 327, 428/213, 480, 482, 325, 332, 331, 446

(56) References Cited

U.S. PATENT DOCUMENTS

| | | | |
|---|---|---|---|
| 4,533,509 | * 8/1985 | Gust et al. | 264/171 |
| 5,294,474 | * 3/1994 | Assante et al. | 428/143 |
| 5,480,715 | * 1/1996 | Mills et al. | 428/327 |
| 5,532,047 | * 7/1996 | Okazaki et al. | 428/213 |
| 5,610,222 | * 3/1997 | Mills et al. | 524/493 |
| 5,626,959 | * 5/1997 | Mills et al. | 428/331 |
| 5,677,034 | * 10/1997 | Okazaki et al. | 428/141 |
| 5,925,447 | * 7/1999 | Gust et al. | 428/219 |

\* cited by examiner

*Primary Examiner*—Bruce H. Hess
*Assistant Examiner*—B. Shewareged
(74) *Attorney, Agent, or Firm*—Andrew G. Golian

(57) ABSTRACT

A composite film is described which consists of a primary unfilled polyester layer and a secondary polyester layer containing from 1 to 8% by weight, based on the weight of the secondary polyester layer, of finely divided silica particles having a volume weighted mean particle size diameter D[4,3] of from 2.3 to 6.2 micrometers. The composite film is used in backlit displays such as illuminated signboards and provides uniform light transmission while maintaining the same strength of illumination at all points over the area of the display.

4 Claims, No Drawings

BACKLIT DISPLAY COMPOSITE FILM

FIELD OF THE INVENTION

The present invention relates to a polyester composite film, for use in backlit display applications such as illuminated signboards, which provides uniform light transmission while maintaining the same strength of illumination at all points over the area of the display.

BACKGROUND OF THE INVENTION

Illuminated signboards have been used for many years to advertise the names of stores and businesses because of their high visibility both during the day or at night. The simplest such signs typically comprise a frame containing a light source, which may be incandescent, or fluorescent, and a translucent panel bearing the printed information mounted in front of the light source. The translucent panel is typically rigid and made from ground glass or plastic materials such as high impact polystyrene, poly(methylmethacrylate) sheeting, etc., and the image is formed by paint or screen printed ink directly onto the panel. Such signs are more or less permanent, and usually remain in place for many years. It is important that the panel be translucent rather than transparent, so that the back of the frame and the light source itself is not visible through the unpainted or unprinted areas.

More recently, illuminated signs have been used for general advertising which require more complex images of higher visual impact, and which usually require that the content be changed from time to time. Such signs have become widely used in many public places both indoors and outdoors such as airports, rail and bus stations, hotel lobbys, theaters, pedestrian under-passes, etc. This type of illuminated sign is often referred to as a "backlit display", and there are many designs used to achieve the purpose of the display. However, a commonly used display consists of a box containing a light source at the back and a frame in front which holds the image. The frame may be made from glass or plastic as before, but in this case the material of the frame is transparent and the image is printed on a translucent substrate which is flexible in order to allow easier installation and removal. Using a flexible image media also allows a greater choice of cheaper imaging processes.

The degree of light transmission of the image media is important because if the material is too opaque, the image will appear dull and the colors will lose their vibrancy. At the same time, the light from the incandescent bulbs or fluorescent tubes in the back of the display must be highly diffused as it passes through the media or the illumination of the sign will not be uniform. When this happens, the areas of the display directly in front of the light source(s) appear brighter than those further away, and the overall image has an objectionable appearance. Such bright areas are sometimes called "hot spots" and avoiding them often requires that the media must have lower light transmission. Clearly, the degree of light transmission must be very uniform so that the strength of illumination of the image is the same at all points over the area of the display.

For low to moderate quality backlit display applications, the image substrate is usually a thin paper stock. The fibrous structure of the paper provides a means to diffuse the light, but a thin paper is needed to provide sufficient light transmission. The image is formed on the paper by conventional gravure printing or offset lithographic printing or by other known printing processes. This type of media has the advantages of low cost and the ability to produce many copies easily, but quality is always limited by the non-homogeneous composition of the paper. The amount of light passing through the paper varies considerably from point to point as the thickness of the paper and the local density of pulp fibers always varies. This leads to a mottled effect in solid print areas and greatly limits the quality of the image which can be produced using paper in a backlit display. Paper also has inherent problems of easy tearing, damage by moisture, dimensional change under different humidity conditions and yellowing.

For high quality images, photographic processes have been used to produce images in a photoemulsion coated on a plastic substrate, usually polyethylene terephthalate (PET) film. This is very costly compared to conventional printing on paper, but image quality and visual impact can be extremely high and the imaging media based on PET film is much more durable than paper. Recently, wide format inkjet printing has come to be widely used as a lower cost alternative to the photographic process for producing high quality images for backlit display, and again the printing medium is typically a polyester film bearing a coating to absorb the water based inkjet ink. Recent advances in inkjet printing technology have allowed the image quality produced to rival that of the photographic process, especially in applications such as backlit displays where the image is typically viewed from a distance of several feet.

Until now, in both photographic and inkjet printed backlit signs, the required translucency of the imaging media has been achieved by coating the transparent PET film substrate with a light diffusing coating, usually a mixture of a resin or gelatin binder and a finely dispersed pigment, such as titanium dioxide. This light diffusing coating is usually applied to the reverse side of the film from the imaging side. In both photographic and inkjet media, a coating has to be applied to the reverse side of the film anyway to control curl of the media which would otherwise occur during printing/processing due to hygroscopic expansion of the image coating, so the light diffusing coating does not unnecessarily complicate the structure of the final product. The same coating can be used on transparent PET films of different thickness so that the backlit display media can easily be produced in a range of thicknesses, all having the same light transmission properties.

While satisfying many of the requirements of backlit displays, this diffuser coating approach has a number of inherent disadvantages. As the light transmission of the media must be very uniform for high quality images, the thickness of the light diffuser coating must also be very uniform from point to point. Any defects in the light diffuser coating are strongly highlighted under backlit display conditions, so the quality requirements of this coating must be extremely high. Accordingly, production efficiencies for light diffuser coatings are often much less than for clear coatings so that production costs for backlit display media are relatively high. Additionally, advances in inkjet receiver coatings have produced many systems today which resist curling without the use of any backcoating, but these simpler structures with their lower production costs offer no advantage in backlit display films because of the need for light diffusion. A final problem with the light diffusion coatings is that unless they are very hard and well adhered to the substrate PET film, they can be easily damaged by handling after printing or during installation. Even a light scratch will show up strongly under backlit conditions, especially if it occurs in a dark area of the image. Re-work at this final stage of backlit display production is extremely costly.

Accordingly, an object of the present invention is to provide a polyester composite film for backlit display media which has the necessary light diffusion properties built directly into the film. This eliminates the need to apply a costly light diffuser coating to the film and reduces overall production costs accordingly. Incorporation of a light diffusing filler directly into the coextruded polyester composite film not only allows very uniform light diffusing properties to be achieved, but also results in a much more durable structure with less pin-holing than using conventional coatings. Such a composite film advantageously reduces re-work for backlit display printers and installers.

U.S. Pat. No. 5,680,720, issued to Asazuma et al on Oct. 28, 1997, discloses a semi-transparent laminated film for use in an illuminated signboard comprising a biaxially stretched thermoplastic resin film substrate and a monoaxially stretched thermoplastic film, preferably a polyolefin copolymer film, containing from 0.3 to 5% by weight of a reflective white powder such as titanium dioxide and zinc oxide. The incorporation of titanium dioxide and zinc oxide into the film causes an increase in the opacity of the film accompanied by a drop in light transmittance. In contrast, the present invention incorporates silica particles in the film having an optimum particle size to enhance light scattering. Most of the light is scattered forward, i.e. it contributes to the brightness of the display image as contrasted to titanium dioxide which scatters tip to 50% of the light backwards and therefore wastes this portion of the light.

SUMMARY OF THE INVENTION

The present invention provides, in a first aspect thereof, a polyester composite film comprising a primary transparent, unfilled polyester layer and a secondary filled polyester layer formed on at least one surface of the primary polyester layer, wherein the secondary polyester layer has a thickness of from 2.5 to 35 micrometers and comprises from 5 to 20% of the total thickness of the primary and the secondary polyester layers and comprises from 1 to 8% by weight, based on the weight of the secondary polyester layer of finely divided silica particles having a volume weighted mean particle diameter D[4,3] of from 2.3 to 6.2 micrometers, a porosity of from 0.44 to 1.6 ml/g and a surface area of from 300 to 700 $m^2/g$, said polyester composite film having (a) a total luminous transmission (TLT) of at least 30% measured according to ASTM Method D1003 and (b) an angular light scattering ratio $(I_2/I_0)$ of at least 0.02 wherein $I_2$ and $I_0$ are the light intensities measured at an angle of 2 degrees and 0 degrees, respectively, from a line perpendicular to the plane of the film.

The present invention further provides, in a second aspect thereof, a backlit display comprising a polyester composite film having an image or characters printed thereon, a frame to which the composite film is attached, and a light source for illuminating the composite film, said polyester composite film comprising a primary transparent, unfilled polyester layer and a secondary filled polyester layer formed on at least one surface of the primary polyester layer, wherein the secondary polyester layer has a thickness of from 2.5 to 35 micro-meters and comprises from 5 to 20% of the total thickness of the primary and secondary polyester layers and comprises from 1 to 8% by weight, based on the weight of the secondary polyester layer of finely divided silica particles having a volume weighted mean particle diameter D[4,3] of from 2.3 to 6.2 micrometers, a porosity of 0.44 to 1.6 ml/g and a surface area of from 300 to 700 $m^2/g$, said polyester composite film having (a) a total luminous transmission (TLT) of at least 30% measured according to ASTM Method D1003 and (b) an angular light scattering ratio $(I_2/I_0)$ of at least 0.02 wherein $I_2$ and $I_0$ are the light intensities measured at an angle of 2 degrees and 0 degrees, respectively, from a line perpendicular to the plane of the film.

According to the present invention, the specific concentration and particle size of the silica particles used in the secondary polyester layer have been found to provide adequate light diffusion while providing minimal light backscattering and high light transmission.

DETAILED DESCRIPTION OF THE INVENTION

The present invention provides a polyester composite film for backlit display media comprising a primary transparent, unfilled polyester layer having on at least one surface thereof a secondary polyester layer comprising, based on the weight of the secondary polyester layer, from 1 to 8% by weight of finely divided inorganic filler particles, preferably silica particles, having a volume weighted mean particle diameter D[4,3] of from 2.3 to 6.2 microns.

The primary polyester film layer of the present invention is substantially transparent and may be formed from any synthetic linear polyester which may be obtained by condensing one or more dicarboxylic acids or their lower alkyl (up to 6 carbon atoms) diesters, for example terephthalic acid, isophthalic acid, phthalic acid, 2,5-, 2,6- or 2,7-naphthalenedicarboxylic acid, succinic acid, sebacic acid, adipic acid, azelaic acid, 4,4'-diphenyldicarboxylic acid, hexahydroterephthalic acid or 1,2-bis-p-carboxyphenoxyethane (optionally with a monocarboxylic acid, such as pivalic acid) with one or more glycols, particularly aliphatic glycols, for example ethylene glycol, 1,3-propanediol, 1,4-butanediol, neopentyl glycol and 1,4-cyclohexanedimethanol. A polyethylene terephthalate film is particularly preferred, especially such a film which has been biaxially oriented by stretching in two mutually perpendicular directions, typically at a temperature in the range of 70° to 125° C., and preferably heat set, typically at a temperature in the range of 150° to 250° C., for example as described in British Patent 838708.

The polyester film may be unoriented, or uniaxially oriented, but is preferably biaxially oriented by drawing in two mutually perpendicular directions in the plane of the film to achieve a satisfactory combination of mechanical and physical properties. Simultaneous biaxial orientation may be effected by extruding a polyester tube which is subsequently quenched, reheated and then expanded by internal gas pressure to induce transverse orientation, and withdrawn at a rate which will induce longitudinal orientation. Sequential stretching may be effected in a stenter process by extruding the polyester as a flat extrudate which is subsequently stretched first in one direction and then in the other mutually perpendicular direction. Generally, it is preferred to stretch first in the longitudinal direction, i.e., the forward direction through the film stretching machine, and then in the transverse direction. A stretched film may be, and preferably is, dimensionally stabilized by heat-setting under dimensional restraint at a temperature above the glass transition temperature of the film.

The secondary polyester film layer according to the invention comprises any one or more of the polyester films hereinbefore described as being suitable for use in forming the primary polyester layer. In a preferred embodiment of the invention both the primary and the secondary polyester layers comprise the same polyester, particularly polyethylene terephthalate.

Formation of the secondary polyester layer on the primary polyester layer may be effected by conventional techniques, for example, by casting the polymer onto a preformed polyester layer. Conveniently, however, formation of the composite sheet is effected by coextrusion, either by simultaneous coextrusion of the respective film-forming layers through independent orifices of a multi-orifice die, and thereafter uniting the still molten layers, or, preferably, by single channel coextrusion in which molten streams of the respective polyester polymers are first united within a channel leading to a die manifold, and thereafter extruded together from the die orifice under conditions of streamline flow without intermixing thereby to produce a composite sheet. A coextruded sheet is stretched to effect molecular orientation of the primary, and preferably also of the secondary layer. In addition, the composite film is preferably heat set.

Secondary polyester layers may be disposed on one or both sides of the primary polyester layer to form either AB or BAB type composites. The composite films of the invention have a total thickness in the range of from 50 to 250 micrometers, preferably from 100 to 175 micrometers. The secondary polyester layer(s) preferably constitutes from 5 to 20% of the total composite film thickness and preferably has a thickness of from 2.5 to 35 micrometers, more preferably from 5 to 25 micrometers and, most preferably from 8 to 20 micro-meters.

The filler particles suitable for use in the secondary polyester layer of the composite film according to the present invention are silica, preferably synthetic silica, for example, a micronized gel or precipitated silica, most preferably a micronized silica gel.

In order to obtain the advantageous properties of the present invention, the concentration of silica particles present in the secondary polyester layer should be in the range of from 1 to 8% by weight, preferably from 2 to 6% by weight and, most preferably from 3 to 6% by weight based on the weight of the polyester secondary layer. When the content of the particles is less than 1% by weight, the light diffusion of the film is not sufficient. When the content of the particles exceeds 8% by weight, the particles tend to scatter too much light resulting in too small a value for light transmittance and hence an inadequate image brightness.

The volume weighted mean particle diameter defined as D[4,3] according to M. Alderliesten, Part. Part. Syst. Charact., 8, (1991), p. 237, of the silica particles incorporated into the secondary polyester layer ranges from 2.3 to 6.2 micrometers.

The size distribution of the silica particles is also an important parameter, for example, the presence of excessively large particles can result in the film exhibiting excessive speckle and pimples on the film surface. In contrast, presence of an excessive number of small particles in the film can result in an unacceptable level of haze and hence inadequate light transmission leading to poor image brightness. Advantageously, the actual particle size of 99.9% by volume of the silica particles should not exceed 16 micrometers, preferably 13 micrometers and most preferably not exceed 10 micrometers. Preferably, the ratio d75/d25 for the silica particles is within the range of from 1.3 to 2.1. The particle size distribution of the silica is preferably measured in water using a Coulter LS230 instrument.

The silica particles have a porosity of from 0.44 to 1.6 ml/g and a surface area of from 300 to 700 $m^2/g$.

In the polyester composite film of the present invention, the silica particles are substantially confined to the secondary polyester layer. This allows the total thickness of the composite film to be varied independently of the thickness and hence the light diffusing properties of the secondary polyester layer. Advantageously, the light diffusing secondary polyester layer should be as thin as possible and the concentration of silica particles within the secondary layer should be as high as possible in order to provide the best total light transmission and light diffusion by maximization of light scattering within the diffuser polyester layer.

The secondary polyester layer also exhibits excellent adhesion to the primary polyester carrier layer which may not always be true in the case of coated diffuser layers. In addition, the light-scattering silica particles are also wholly anchored, within the secondary polyester layer as contrasted to a conventional diffuser coated polyester film where the coating integrity can many times be inferior. The fillers included in the conventional coating of the film also make the coated film highly susceptible to abrasion and scratching. Finally, a composite polyester film of the invention containing a highly filled polyester layer is highly preferred over a more lightly filled mono-layer film because it promotes more multiple light-scattering events and, therefore, more efficient light diffusion and provides a smooth surface for the image layer, hence a better image quality.

Particle sizes of the silica particles may be measured by electron microscope, coulter counter, sedimentation analysis and static or dynamic light scattering. Techniques based on laser light diffraction are preferred for determining the particle size of silica particles. Particularly preferred is the use of the Coulter LS230 light scattering instrument. The median particle size may be determined by plotting a cumulative distribution curve representing the percentage of particle volume below chosen particle sizes and measuring the $50^{th}$ percentile.

The silica particles may be added to the polymeric secondary layer or polymeric secondary layer-forming material at any point in the polyester film manufacturing process prior to the extrusion of the polymer. It is preferred to incorporate the silica particles as a glycol dispersion during the esterification reaction stage of the polyester synthesis, or via extrusion compounding. The use of a silica filled polymer masterbatch may also be beneficial.

The layers of a composite film according to the invention may conveniently contain any of the additives conventionally employed in the manufacture of polyester films. Thus, agents such as polymer blends (for example polyester copolymers, polyolefins and polyolefin elastomers, polyester elastomers), compatibilizers (for example waxes, ester waxes),dyes, pigments, lubricants, anti-oxidants, anti-blocking agents, surface active agents, slip aids, gloss-improvers, prodegradants, ultra-violet light stabilizers, optical brighteners, viscosity modifiers and dispersion stabilizers may be incorporated in the primary and/or secondary layer(s), as appropriate. It is preferred that the primary polyester layer contains little or no filler in order to yield a film of maximum optical properties and optimum image qualities. However, the primary polyester layer may contain relatively small quantities of filler material, (preferably less than 1000 ppm for example), due to the nonnal practice of using reclaimed film in the film manufacturing process.

The composite film of the invention may be coated on one or both surfaces with one or more adhesion promoting and/or antistatic coatings. Preferred adhesion and/or antistatic coatings may be water or solvent based and may comprise emulsion polymers and/or solution polymers, cross-linking agents, cross-linking catalysts or initiators, surfactants, salts of organic acids and/or bases, etc.. Particularly beneficial are water based adhesion promoting coatings which are applied after monoaxially stretching the film in the direction of extrusion but prior to stretching in the transverse direction such as are disclosed in U.S. Pat. Nos. 4,391,767, 3,751,280, 4,888,381 and 4,123,278.

The coextruded polyester composite film of the invention advantageously replaces diffuser coatings which are conventionally applied to the polyester base film in the manufacture of backlit media. The diffuser coatings are difficult to apply uniformly, scratch off the film easily and are more expensive and less durable than the coextruded composite film.

The composite film of the present invention can be used in backlit displays such as illuminated signboards for displaying menus, prices for restaurants; for commercial advertising in department stores, supermarkets, hotels, airports; and for displaying fashion, landscape or aerial photographs in living, reception or exhibition rooms. A backlit display comprising a composite film of the present invention may also form part of a larger mechanism, such as the front of a vending machine.

In actual practice, an imaging coating is applied to the smooth primary polyester side of the composite film and, after providing an image in the coating, the composite film is mounted in a backlit display box with the silica containing secondary layer side facing the light source, usually a bank of fluorescent tubes or incandescent bulbs. The silica filled polyester layer in the film diffuses the light from the light source while still allowing a high proportion of the light to pass through the film. The diffusion provides constant illumination over the entire image and avoids any hot spots where the light tubes are located. The highest concentration of silica particles is used in the thinnest possible diffuser layer in order to maximize multiple light scattering events.

The following test methods were used to determine the transmission and light scattering properties of the composite film.

Total luminous transmission (TLT) was measured in accordance with Standard Test Method ASTM D1003 for determining haze and luminous transmittance of transparent plastics. The instrument used was a BYK Gardner XL-211 Hazeguard System.

Angularly resolved light scattering measurements were made using a polarized 40 mW Ar+ laser at a wavelength of 488 nm. A silicon photodiode was scanned from the position of the directly transmitted beam through an angle of 30 degrees and the intensity of the scattered light recorded. The measurement was also carried out on the laser beam (without the sample present) for comparison. In general, the most important differences between the light scattering curves were in the low angle region. Using smoothed data, the ratio of light intensity ($I_2/I_0$) at two degrees to that at zero degrees provides a quantifiable measure of light scattering.

The composite polyester film of the present invention exhibits a total luminous transmission (TLT) of at least 30%, and an angular light scattering ratio of at least 0.02.

If the TLT falls below the above defined value the image brightness becomes unacceptable. If the $I_2/I_0$ ratio falls below the above defined value insufficient light scattering will take place and uneven illumination will result.

The present invention will be further described in the following examples.

EXAMPLE 1

A composite film comprising polyethylene terephthalate as the primary layer and a light diffusing secondary layer of polyethylene terephthalate containing 5% by weight of silica particles having a volume weighted mean diameter of 4.4 $\mu$m, a surface area of 306 m$^2$/g, and a pore volume of 1.2 ml/g was produced.

The film was prepared using polymer made by a conventional process by ester interchange of ethylene glycol with dimethylterephthalate followed by polycondensation. After terminating the polycondensation, the polymer was cut into small granules suitable for extrusion.

The composite film was produced from the above polyester by a process of single channel coextrusion wherein streams of polyethylene terephthalate alone and of a mixture of the polyethylene terephthalate with a polyester masterbatch (such that the blend contained 5% by weight of the silica particles) supplied by separate extruders were united in a tube leading to the manifold of an extrusion die and were extruded simultaneously through the die under conditions of streamline flow and without intermixing. The composite film emerging from the extrusion die was quenched immediately upon a water-cooled rotating metal drum having a polished surface and stretched to 3 to 3.25 times its original dimension in the direction of extrusion at a temperature of about 90° C. The monoaxially oriented film was passed into a stenter oven, where the film was stretched in the transverse direction to approximately 3.4 to 3.6 times its original dimensions. The biaxially stretched composite film was heat set at a temperature of about 220° C. in a stenter oven. The resulting composite film comprised a polyethylene terephthalate primary layer of about 157 $\mu$m thickness and a light diffusing secondary polyethylene terephthalate layer of 18 $\mu$m thickness. The composite film had the following properties.

Total luminous transmission=50%

$I_2/I_0=0.9$

An image formed directly on the composite film or onto an essentially or partially transparent coating on the composite film by conventional means was successfully used in a backlit display.

EXAMPLE 2

A composite film comprising polyethylene terephthalate as the primary layer and a light diffusing secondary layer of polyethylene terephthalate containing 4% by weight of silica particles having a volume weighted mean diameter of 4.4 $\mu$m, a surface area of 306 m$^2$/g, and a pore volume of 1.2 ml/g was produced.

The composite film was prepared using polymer made by a conventional process by ester interchange of ethylene glycol with dimethyl terephthalate followed by polycondensation. After terminating the polycondensation, the polymer was cut into small granules suitable for extrusion.

The composite film was produced from the above polyester by a process of single channel coextrusion wherein streams of polyethylene terephthalate alone and of a mixture of the polyethylene terephthalate with a polyester masterbatch (such that the blend contained 4% by weight of the silica particles) supplied by separate extruders were united in a tube leading to the manifold of an extrusion die and were extruded simultaneously through the die under conditions of streamline flow and without intermixing. The composite film emerging from the extrusion die was quenched immediately upon a water-cooled rotating metal drum having a polished surface and stretched to 3 to 3.25 times its original dimension in the direction of extrusion at a temperature of about 90+ C. The monoaxially oriented film was passed into a stenter oven, where the film was stretched in the transverse direction to approximately 3.4 to 3.6 times its original dimensions. The biaxially stretched film was heat set at a temperature of about 220° C. in a stenter oven. The resulting composite film comprised a polyethylene terephthalate primary layer of about 160 μm thickness and a light diffusing secondary polyethylene terephthalate layer of 18 μm thickness. The composite film had the following properties.

Total luminous transmission=70%

$I_2/I_0$=0.05

An image formed directly on the composite film or onto an essentially or partially transparent coating on the film by conventional means was suitable for use in a backlit display where greater brightness was required.

EXAMPLE 3

A composite film comprising polyethylene terephthalate as the primary layer and a light diffusing secondary layer of polyethylene terephthalate containing 7.5% by weight of silica particles having a volume weighted mean diameter of 4.4 μm, a surface area of 306 $m^2/g$, and a pore volume of 1.2 ml/g was produced.

The composite film was prepared using polymer made by a conventional process by ester interchange of ethylene glycol with dimethyl terephthalate followed by polycondensation. After terminating the polycondensation, the polymer was cut into small granules suitable for extrusion.

The composite film was produced from the above polyester by a process of single channel coextrusion wherein streams of polyethylene terephthalate alone and of a polyester resin containing 7.5% of the aforementioned silica particles supplied by separate extruders were united in a tube leading to the manifold of an extrusion die and were extruded simultaneously through the die under conditions of streamline flow and without intermixing. The composite film emerging from the extrusion die was quenched immediately upon a water-cooled rotating metal drum having a polished surface and stretched to 3 to 3.25 times its original dimension in the direction of extrusion at a temperature of about 90° C. The monoaxially oriented film was passed into a stenter oven, where the film was stretched in the transverse direction to approximately 3.4 to 3.6 times its original dimensions. The biaxially stretched film was heat set at a temperature of about 220° C. in a stenter oven. The resulting film comprised a polyethylene terephthalate primary layer of about 90 μm thickness and a light diffusing secondary polyethylene terephthalate layer of 10 μm thickness. The composite film had the following properties.

Total luminous transmission=50%

$I_2/I_0$=1.0

An image formed directly on the composite film or onto an essentially or partially transparent coating on the film by conventional means was successfully used in a backlit display.

EXAMPLE 4

A composite polyester film was prepared as described in Example 1 except that an aqueous coating comprising an acrylic emulsion polymer and a melamine-formaldehyde cross-linking agent was applied by a standard roll-coating process to the monoaxially oriented film before the film was stretched in the transverse direction. The coating was applied so as to give a dry coat-weight on the final film of approximately 0.025 $g/m^2$. An image formed directly on the coated film by conventional printing processes or by an electrophotographic process showed superior printability and ink/toner adhesion when compared with Example 1 and was successfully used in a backlit display.

EXAMPLE 5

A composite polyester film was prepared as described in Example 1 except that an aqueous coating comprising a polymer containing amino groups, a melamine formaldehyde cross-linking agent and the ammonium salt of an aromatic sulphonic acid was applied by a standard roll-coating process to the monoaxially oriented film before the film was stretched in the transverse direction. The coating was applied so as to give a dry coat-weight on the final film of approximately 0.015 $g/m^2$. A subsequently applied inkjet imaging coating applied to the film by conventional means showed superior adhesion when compared with Example 1 and an inkjet image formed in that coating was successfully used in a backlit display.

EXAMPLE 6

A composite polyester film was prepared as described in Example 1 except that an aqueous coating comprising a water dispersible polyester resin and a polymer containing amine groups was applied by a standard roll-coating process to the monoaxially oriented film before the film was stretched in the transverse direction. The coating was applied so as to give a dry coat-weight on the final film of approximately 0.1 $g/m^2$. An image formed directly on the coated film by conventional means using water based inks showed superior printability and ink adhesion when compared with Example 1 and was successfully used in a backlit display.

EXAMPLE 7

A composite polyester film was prepared as described in Example 1 except that an aqueous coating comprising a styrene containing acrylic polymer and a melamine-formaldehyde cross-linking agent was applied by a standard roll-coating process to the monoaxially oriented film before the film was stretched in the transverse direction. The coating was applied so as to give a dry coat-weight on the final film of approximately 0.1 $g/m^2$. A corona discharge treatment was applied to the coating surface before the film was wound up. A subsequently applied photoemulsion imaging coating applied to the film by conventional means showed superior adhesion when compared with Example 1 and a photographic image formed in that coating was successfully used in a backlit display.

EXAMPLE 8

This is a comparative example not according to the invention.

A composite film comprising polyethylene terephthalate as the primary layer and a light diffusing secondary layer of polyethylene terephthalate containing 8% by weight of an anatase titania having a crystal size of 0.15 micron was produced.

The composite film was prepared using polymer made by a conventional process by ester interchange of ethylene glycol with dimethyl terephthalate followed by polycondensation. After terminating the polycondensation, the polymer was cut into small granules suitable for extrusion.

The composite film was produced from the above polyester by a process of single channel coextrusion wherein streams of polyethylene terephthalate alone and of a mixture of the polyethylene terephthalate with a polyester masterbatch (such that the blend contained 8.0% of the titania) supplied by separate extruders were united in a tube leading to the manifold of an extrusion die and were extruded simultaneously through the die under conditions of streamline flow and without intermixing. The composite film emerging from the extrusion die was quenched immediately upon a water-cooled rotating metal drum having a polished surface and stretched to 3 to 3.25 times its original dimension in the direction of extrusion at a temperature of about 90° C. The monoaxially oriented film was passed into a stenter oven, where the film was stretched in the transverse direction to approximately 3.4 to 3.6 times its original dimensions. The biaxially stretched film was heat set at a temperature of about 220° C. in the stenter oven. The resulting film comprised a polyethylene terephthalate primary layer of about 88 μm thickness and a light diffusing secondary polyethylene terephthalate layer of 12 μm thickness. The composite film had the following properties.

Total luminous transmission=48%

$I_2/I_0$=0.003

An image formed directly on the composite film or onto an essentially or partially transparent coating on the film by conventional means was unsuitable for use in a backlit display because inadequate diffusion of light caused uneven illumination and visibility of the light source.

What is claimed is:

1. A polyester composite film comprising a primary transparent, unfilled polyester layer and a secondary filled polyester layer formed on at least one surface of the primary polyester layer, wherein the secondary polyester layer has a thickness of from 2.5 to 35 micrometers and comprises from 5 to 20% of the total thickness of the primary and the secondary polyester layers and comprises from 1 to 8% by weight, based on the weight of the secondary polyester layer of finely divided silica particles having a volume weighted mean particle diameter D[4,3] of from 2.3 to 6.2 micrometers, a porosity of from 0.44 to 1.6 ml/g and a surface area of from 300 to 700 m$^2$/g, coated on one or both exposed polyester surfaces with an adhesion promoting and/or antistatic aqueous or solvent based emulsion or solution polymer coating, said coating comprising a polyester resin and a polymer containing amino groups or a styrene containing acrylic polymer and a melamine-formaldehyde cross-linking agent, wherein said polyester composite film has (a) a total luminous transmission (TLT) of at least 30% measured according to ASTM Method D1003 and (b) an angular light scattering ratio ($I_2/I_0$) of at least 0.02 wherein $I_2$ and $I_0$ are the light intensities measured at an angle of 2 degrees and 0 degrees, respectively, from a line perpendicular to the plane of the time.

2. The polyester composite film of claim 1 wherein the coating comprises an aqueous dispersion of a polyester resin and a polymer containing amino groups.

3. The polyester composite film of claim 1 wherein the coating comprises an aqueous coating of a styrene containing acrylic polymer and a melamine-formaldehyde cross-linking agent.

4. The polyester composite film of claim 1 wherein the adhesion promoting and/or antistatic coating is applied to the surface of the primary polyester layer remote from the secondary polyester layer.

* * * * *